(12) United States Patent
Tanaka et al.

(10) Patent No.: US 6,417,345 B1
(45) Date of Patent: Jul. 9, 2002

(54) METHOD FOR PRODUCING ACETYLATED PYROXYLIN

(75) Inventors: Tokuji Tanaka; Noboru Kamei; Hideo Yabune, all of Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/414,832

(22) Filed: Oct. 8, 1999

(30) Foreign Application Priority Data

Oct. 2, 1998 (JP) .......................................... 10-289634

(51) Int. Cl.⁷ .............................. C08B 5/02; C08B 5/04
(52) U.S. Cl. ............................. 536/36; 536/37; 536/38
(58) Field of Search .............................. 536/36, 37, 38

(56) References Cited

U.S. PATENT DOCUMENTS

| | | | |
|---|---|---|---|
| 2,125,880 A | * 8/1938 | Berl | |
| RE20,997 E | * 2/1939 | De Stubner | 106/37 |
| 3,251,823 A | * 5/1966 | Murphy | 260/223 |
| 3,925,125 A | * 12/1975 | Cox et al. | |

FOREIGN PATENT DOCUMENTS

| JP | 56-82849 | 7/1981 |
|---|---|---|
| JP | 8-277301 | 10/1996 |
| JP | 10-195292 | 7/1998 |

OTHER PUBLICATIONS

Derwent abstract of RU 2092493 (Oct. 1997).*

* cited by examiner

Primary Examiner—James O. Wilson
Assistant Examiner—Leigh C. Maier
(74) Attorney, Agent, or Firm—Armstrong, Westerman & Hattori, LLP

(57) ABSTRACT

The invention provides a method for producing acetylated pyroxylin with safety yet at low cost, using inexpensive water-wetted pyroxylin rather than expensive alcohol-wetted pyroxylin. The acetylated pyroxylin is produced by dehydrating the water-wetted pyroxylin in the presence of a nonalcoholic non-solvent for pyroxylin, and then permitting an acetylating agent to act on the dehydrated pyroxylin. According to the first dehydration process, the water-wetted pyroxylin is dispersed in a dispersing medium comprising a nonalcoholic non-solvent for pyroxylin, and then dehydrated by distillation. According to the second dehydration process, a replacing agent comprising a nonalcoholic non-solvent for pyroxylin is added to the water-wetted pyroxylin, and the wetted pyroxylin is then dehydrated by filtration. With either one of these processes, the water-wetted pyroxylin can be dehydrated with safety.

8 Claims, No Drawings

METHOD FOR PRODUCING ACETYLATED PYROXYLIN

TECHNICAL ART

The present invention relates to a method for producing acetylated pyroxylin (or, in another parlance, cellulose acetate nitrate) used as starting materials for explosives, paints, etc.

BACKGROUND ART

Acetylated pyroxylin, in which heat resistance is imparted to pyroxylin (or, in another parlance, nitrocellulose), is obtained by dissolving pyroxylin in a suitable organic solvent for an acetylation reaction with anhydrous acetic acid, etc. in the presence of a suitable catalyst, and precipitating the reaction product in water or an alcohol, followed by filtration and washing with water, etc. (see JP-A's 56-82849 and 8-277301).

Acetylated pyroxylin is also obtained by dispersing pyroxylin in a suitable dispersing medium for an acetylation reaction with anhydrous acetic acid in the presence of a suitable catalyst while the pyroxylin is maintained in a fibrous (solid phase) state, and filtering the reaction product, followed by water washing, etc. (see Japanese Patent Application No. 10-195292).

Usually, the starting pyroxylin is provided as alcohol-wetted pyroxylin which is wetted with alcohols such as ethanol and/or isopropanol. This is because dry pyroxylin is very dangerous due to its expressiveness, and so must be handled in a water- or alcohol-wetted state. Usually, however, the alcohol-wetted pyroxylin is used because the water-wetted pyroxylin for explosive or paint purposes is disadvantageous for the reason that water is less susceptible to mixing with other solvents.

Originally, pyroxylin is available in a water-wetted state upon production. To convert this to alcohol-wetted pyroxylin, the water must be replaced by alcohols such as ethanol and/or isopropanol for filtration. Thus, the alcohol-wetted pyroxylin is more expensive than the water-wetted pyroxylin.

In one conventional acetylated pyroxylin production method, such expensive alcohol-wetted pyroxylin is used as the starting material. The alcohols contained in the pyroxylin are first replaced by toluene, etc. Then, the pyroxylin is filtered for removal of the alcohols to avert any reaction between the alcohols and anhydrous acetic acid acting as an acetylating agent. Finally, the pyroxylin is allowed to react with anhydrous acetic acid for acetylation.

In another conventional acetylated pyroxylin production method, water-wetted pyroxylin is first directly dissolved in a solvent such as acetone. Then, an acetylating agent, i.e., anhydrous acetic acid is charged in the solution for an acetylation reaction. However, a problem with this method is that the water in the water-wetted pyroxylin reacts with the acetylating agent or anhydrous acetic acid to yield acetic acid; that is, the efficiency of using anhydrous acetic acid becomes worse, resulting in cost increases.

In yet another conventional acetylated pyroxylin production method, water-wetted pyroxylin is first dried for water removal to avert any reaction between the water and an acetylating agent, i.e., anhydrous acetic acid. Then, the dried pyroxylin is subjected to a similar acetylation reaction as mentioned above. However, a problem with this method is that the use of the dried pyroxylin gives rise to the risk of pyroxylin explosion, etc.

DISCLOSURE OF THE INVENTION

As a result of intensive studies, the inventors have found that water-wetted pyroxylin can be pretreated for a safe acetylation reaction, and so have accomplished the instant invention. It is therefore one object of the invention to provide a method for producing acetylated pyroxylin with safety yet at low cost using inexpensive water-wetted pyroxylin rather than expensive alcohol-wetted pyroxylin.

Thus, the present invention provides a method for producing acetylated pyroxylin by permitting an acetylating agent and a catalyst to act on pyroxylin, characterized in that water-wetted pyroxylin is dehydrated in the presence of a nonalcoholic non-solvent for pyroxylin, and the acetylating agent is then permitted to act on dehydrated pyroxylin.

One aspect of the invention is embodied as follows.

(1) A method for producing acetylated pyroxylin by permitting an acetylating agent and a catalyst to act on pyroxylin, characterized in that water-wetted pyroxylin is dehydrated in the presence of a nonalcoholic non-solvent for pyroxylin, and the acetylating agent is then permitted to act on dehydrated pyroxylin.

(2) The method according to (1) above, characterized in that said acetylating agent is anhydrous acetic acid.

(3) The method according to (1) or (2) above, characterized in that for said dehydration, said water-wetted pyroxylin is dispersed in a dispersing medium comprising said nonalcoholic non-solvent for pyroxylin, and then distilled.

(4) The method according to (3) above, characterized in that said dispersing medium is an aromatic hydrocarbon having 6 to 8 carbon atoms.

(5) The method according to (1) or (2) above, characterized in that for said dehydration, said nonalcoholic non-solvent for pyroxylin is added to said water-wetted pyroxylin as a replacing agent, and said water-wetted pyroxylin is filtered.

(6) The method according to (5) above, characterized in that said replacing agent is an aromatic hydrocarbon having 6 to 8 carbon atoms.

(7) The method according to (5) above, characterized in that said replacing agent is a mixture of an aromatic hydrocarbon having 6 to 8 carbon atoms and a nonalcoholic hydrophilic solvent, said mixture having a composition incapable of dissolving pyroxylin therein.

(8) The method according to (7) above, characterized in that said mixture is a mixture of said aromatic hydrocarbon having 6 to 8 carbon atoms and acetic acid at a weight ratio of 40/60 to 95/5.

(9) The method according to (5) above, characterized in that said replacing agent is an aromatic hydrocarbon having 6 to 8 carbon atoms, with a surface active agent added thereto.

(10) The method according to any one of (4) and (6) to (9) above, characterized in that said aromatic hydrocarbon is toluene.

Another aspect of the invention is embodied as follows.

(11) The method according to any one of (1) to (10) above, characterized in that said water-wetted pyroxylin has a water content of 23 to 50% by weight provided that a total weight of said water-wetted pyroxylin is 100% by weight.

(12) The method according to any one of (1) to (11) above, characterized in that said water-wetted pyroxylin has a water content of 25 to 35% by weight provided that a total weight of said water-wetted pyroxylin is 100% by weight.

(13) The method according to any one of (1) to (12) above, characterized in that said non-solvent for pyroxylin is a nonalcoholic solvent, said solvent being substantially incapable of dissolving pyroxylin therein.

(14) The method according to any one of (1) to (13) above, characterized in that said non-solvent for pyroxylin is a nonalcoholic solvent, said solvent being substantially incapable of dissolving pyroxylin therein and a liquid at up to 110° C.

(15) The method according to (3) above, characterized in that said dispersing medium is a hydrocarbon.

(16) The method according to (3) or (15) above, characterized in that said dispersing medium is selected from a group consisting of aliphatic hydrocarbons, alicyclic hydrocarbons and aromatic hydrocarbons.

(17) The method according to (3), (15) or (16) above, characterized in that said dispersing medium is selected from a group consisting of benzene, toluene, ethylbenzene and xylene.

(18) The method according to any one of (3) and (15) to (17) above, characterized in that said dispersing medium is used in an amount that, on a weight basis, is 5 to 80 times as large as a net weight or weight upon drying of pyroxylin.

(19) The method according to any one of (3) and (15) to (17) above, characterized in that said dispersing medium is used in an amount that, on a weight basis, is 8 to 40 times as large as a net weight or weight upon drying of pyroxylin.

(20) The method according to any one of (3) and (15) to (19) above, characterized in that for said dehydration, distillation is effected under reduced pressure.

(21) The method according to any one of (3) and (15) to (20) above, characterized in that for said dehydration, distillation is effected at a temperature of 110° C. or lower.

(22) The method according to any one of (3) and (15) to (20) above, characterized in that for said dehydration, distillation is effected at a temperature of 105° C. or lower.

Yet another aspect of the invention is embodied as follows.

(23) The method according to (5) above, characterized in that said replacing agent is a hydrocarbon. (24) The method according to (5) or (23) above, characterized in that said replacing agent is selected from a group consisting of aliphatic hydrocarbons, alicyclic hydrocarbons and aromatic hydrocarbons.

(25) The method according to (5), (23) or (24) above, characterized in that said dispersing medium is selected from a group consisting of benzene, toluene, ethylbenzene and xylene.

(26) The method according to any one of (5) and (23) to (25), characterized in that said replacing agent further contains a surface active agent.

(27) The method according to (26) above, characterized in that said surface active agent is an ionic surface active agent or a nonionic surface active agent.

(28) The method according to (27) above, characterized in that said ionic surface active agent is a cationic surface active agent, an anionic surface active agent or an ampholytic surface active agent.

(29) The method according to any one of (5) and (23) to (28) above, characterized in that said surface active agent is added in an amount that, on a weight basis, is 10 to 10,000 ppm with respect to said non-solvent for pyroxylin that is the replacing agent.

(30) The method according to any one of (5) and (23) to (25) above, characterized in that said replacing agent further contains a compound selected from a group consisting of ketones and carboxylic acids.

(31) The method according to any one of (5) and (23) to (25) above, characterized in that said replacing agent further contains a compound selected from a group consisting of acetone and acetic acid.

(32) The method according to (30) or (31) above, characterized in that said non-solvent for pyroxylin that is the replacing agent and said replacing agent selected from the group consisting of ketones and carboxylic acids are mixed together at a mixing weight ratio of 40/60 to 95/5.

(33) The method according to (30) or (31) above, characterized in that said non-solvent for pyroxylin that is the replacing agent and said replacing agent selected from the group consisting of ketones and carboxylic acids are mixed together at a mixing weight ratio of 50/50 to 90/10.

(34) The method according to any one of (5) to (9) and (23) to (33) above, characterized in that said replacing agent is used in an amount that, on a weight basis, is 5 to 80 times as large as a net weight or weight upon drying of pyroxylin.

(35) The method according to any one of (5) to (9) and (23) to (33) above, characterized in that said dispersing medium is used in an amount that, on a weight basis, is 8 to 40 times as large as a net weight or weight upon drying of pyroxylin.

(36) The method according to any one of (5) to (9) and (23) to (35) above, characterized in that filtration is effected with continuous addition of said replacing agent.

(37) The method according to any one of (5) to (9) and (23) to (35) above, characterized in that filtration is effected with addition of said replacing agent according to a batch process.

(38) The method according to any one of (5) to (9) and (23) to (37) above, characterized in that filtration operation is selected from a group consisting of suction filtration, filtration under reduced pressure, press filtration and centrifugal filtration.

(39) The method according to any one of (1) to (38) above, characterized in that treatment for allowing said acetylating agent to act on pyroxylin is effected according to a solid-liquid reaction process or a solution reaction process.

(40) Acetylated pyroxylin excellent in heat resistance, characterized by being obtained by a method as recited in any one of (1) to (39) above.

BEST MODE OF CARRYING OUT THE INVENTION

The water-wetted pyroxylin used as the starting material in the production method according to the invention should preferably have a water content of 23 to 50% by weight, and especially 25 to 35% by weight provided that the total weight of the water-wetted pyroxylin is 100% by weight. Water-wetted pyroxylin having a water content of less than 23% by weight is not preferable in consideration of safety because the pyroxylin often carries the risk of explosion. While water-wetted pyroxylin having a water content of greater than 50% by weight may be used as the starting material, it is understood that its water content should preferably be reduced to 50% by weight or lower by pressing operation and/or drying operation, etc., because much time and large amounts of the replacing agent are possibly needed for dehydration operation according to the invention.

According to the first process for dehydration of the water-wetted pyroxylin, a dispersing medium is selected from alcoholic non-solvents for pyroxylin. The water-wetted pyroxylin is dispersed in the dispersing medium, and then dehydrated by distillation.

By the "non-solvent for pyroxylin" used herein is intended a solvent substantially incapable of dissolving pyroxylin therein. For instance, it is preferable to use a solvent that is a liquid at 110° C. or lower. It is here noted that the "non-solvent for pyroxylin" is used as either the "dispersing medium" or the "replacing agent" in the invention.

The dispersing medium should not dissolve pyroxylin therein. If pyroxylin is dissolved in the dispersing medium, the operation capability of pyroxylin during distillation becomes worse. In addition, it is impossible to produce acetylated pyroxylin according to the solid-liquid reaction process as will be described later. Of the solvents incapable of dissolving pyroxylin therein, alcohols are unacceptable because they react with anhydrous acetic acid added at the later reaction step. Thus, the solvent used herein should be selected from nonalcoholic solvents. Preferably but not exclusively, the solvent is an aliphatic hydrocarbon, an alicyclic hydrocarbon and an aromatic hydrocarbon, although an aromatic hydrocarbon having 6 to 8 carbon atoms is most preferable. Exemplary aromatic hydrocarbons include benzene, toluene, ethylbenzene and xylene, with toluene being most preferred.

The dispersing medium should be used in an amount that, on a weight basis, is 5 to 80 times, and preferably 8 to 40 times as large as the net weight or weight upon drying of pyroxylin. In less than five-fold amounts, the fluidity of a pyroxylin/dispersing medium mixture becomes low, offering problems in connection with the heat transfer, etc. for dehydration by distillation. In greater than eighty-fold amounts, the dispersing medium may be used; however, production efficiency becomes worse.

To dehydrate such a mixture of dispersing medium and water-wetted pyroxylin by distillation in a vessel such as a reactor, heat is applied to the mixture under agitation through a jacket or the like while the resulting vapor mixture of water and dispersing medium is discharged out of the vessel. Preferably, the vapor should be cooled and liquefied through a condenser. When the aromatic hydrocarbon having 6 to 8 carbon atoms is selected as the dispersing medium, the resulting vapor separates into water and the dispersing medium upon liquefaction. This dispersing medium may then be fed back to the vessel such as the reactor. The dehydration operation should preferably be continued until the predetermined amount of water is discharged or the amount of liquefied water vapor reaches an equilibrium upon the checking of the amount of liquefied water vapor. It is here noted that water in the form of vapor may escape out of the system through the condenser or unevaporated water remains in the reactor, and so the amount of water contained in the charged water-wetted pyroxylin is not always in coincidence with the amount of water discharged.

The pressure for dehydration is preferably atmospheric pressure. However, it is acceptable to carry out the dehydration operation at low temperature under reduced pressure. In most cases, azeotropic phenomena occur depending on how the dispersing medium is combined with water. The boiling point is determined depending on the combination and composition as well as pressure, and with this in mind, how heat is applied to the jacket or the like should be determined. It is here noted that the pressure should be controlled such that the temperature during dehydration becomes 110° C. or lower, and preferably 105° C. or lower. With the temperature exceeding 110° C., pyroxylin may possibly break down.

To bring the dehydration operation to an end, the temperature of the jacket or the like is lowered. When the operation is carried out under reduced pressure, the pressure is returned back to atmospheric pressure. Thereafter, the acetylation operation is carried out.

According to the second process for dehydration of water-wetted pyroxylin used herein, a nonalcoholic solvent selected from the non-solvents for pyroxylin is used as the replacing agent. The water-wetted pyroxylin is dehydrated by filtration with the replacing agent added thereto.

For the replacing agent, selection should be made from replacing agents incapable of dissolving pyroxylin therein, and especially nonalcoholic replacing agents because alcoholic replacing agents react with anhydrous acetic acid. For instance, hydrocarbons including an aliphatic hydrocarbon and an alicyclic hydrocarbon may be used for such a replacing agent. However, it is preferable to use an aromatic hydrocarbon, e.g., an aromatic hydrocarbon having 6 to 8 carbon atoms. Specifically, benzene, toluene, ethylbenzene and xylene are usable, although toluene is a typical replacing agent.

In some cases, the replacing agent used herein is less compatible with water, and so less effective for dehydration. It is then acceptable to add a surface active agent to the replacing agent. For instance, a $C_{6-8}$ aromatic hydrocarbon with a surface active agent added thereto may be used as the replacing agent. No particular limitation is imposed on the type of surfactant; that is, both an ionic surfactant (e.g., a cationic, anionic or ampholytic surfactant) and a nonionic surfactant may be used. The amount of the surfactant added should preferably be 10 to 10,000 ppm on a weight basis with respect to the aromatic hydrocarbon. Although the surfactant may be used at less than 10 ppm, it is understood that the compatibility of the replacing agent with water becomes worse, and so the effect of filtration on dehydration becomes slender. Although the surfactant may again be used at greater than 10,000 ppm, it is understood that a cost-effective problem arises because of an increase in the amount of the surfactant used. When the $C_{6-8}$ aromatic hydrocarbon with the surfactant added thereto is used as the replacing agent, a surfactant-free $C_{6-8}$ aromatic hydrocarbon should preferably be added to the water-wetted pyroxylin upon filtration to remove the surfactant by re-filtration.

Instead of the $C_{6-8}$ aromatic hydrocarbon with the surfactant added thereto, it is also acceptable to use as a replacing agent well compatible with water a mixture of the $C_{6-8}$ aromatic hydrocarbon and a nonalcoholic hydrophilic solvent. The mixture used to this end should preferably have a composition incapable of dissolving pyroxylin therein. Exemplified for the hydrophilic solvent are ketones such as acetone and carboxylic acids such as acetic acid, of which acetic acid is preferred.

When the mixture of the $C_{6-8}$ aromatic hydrocarbon and acetic acid is used as the replacing agent, the aromatic hydrocarbon and acetic acid should preferably be mixed together at a weight ratio of 40/60 to 95/5, and especially 50/50 to 90/10. When the weight ratio between the aromatic hydrocarbon and acetic acid is smaller than 40/60, no proper dehydration often occurs, because the acetic acid is a good solvent for pyroxylin, and so pyroxylin often dissolves partly therein. A mixture of the aromatic hydrocarbon and acetic acid at a weight ratio of greater than 95/5 may be used; however, the compatibility of the mixture replacing agent with water becomes worse, and so the effect of filtration on dehydration becomes slender.

The amount of the replacing agent is used in an amount that, on a weight basis, is 5 to 80 times, and preferably 8 to 40 times as large as the net weight or weight upon drying of pyroxylin. In less than five-fold amounts, the effect on dehydration often becomes insufficient. The replacing agent may be used in greater than eighty-fold amounts; however, this is not economical because the effect on dehydration is substantially saturated.

A specific operation for adding the replacing agent to the water-wetted pyroxylin and then dehydrating the water-wetted pyroxylin by filtration is now explained. The water-wetted pyroxylin is charged in a filter, and the replacing agent is added thereto. Then, the pyroxylin is filtered. The water-wetted pyroxylin may be filtered while the replacing agent is continuously added thereto. Alternatively, the water-wetted pyroxylin may be filtered in a batch process wherein the filtration of the water-wetted pyroxylin with a constant amount of the replacing agent added thereto is repeated as required. For filtration, all known filteration processes such as suction filtration, filtration under pressure, press filtration and centrifugal filtration may be used.

Alternatively, the water-wetted pyroxylin and the replacing agent may be charged together in a vessel or the like, wherein they are stirred into a slurry. Then, the slurry is fed to a filter where it is filtered. In this embodiment wherein some water often remains in one single dehydration operation, it is preferable to repeat the dehydration operation twice or more or carry out additional filtration with another amount of the replacing agent added to the pyroxylin subjected to the first filtration.

After the completion of filtration, the wetted pyroxylin is charged in the reactor while the replacing agent remains unevaporated, and then subjected to the acetylation operation.

While the first and second processes for dehydration of water-wetted pyroxylin used herein are explained above, it is understood that even with either one of these processes it is possible to dehydrate the water-wetted pyroxylin with safety not by way of dry pyroxylin carrying the risk of explosion. The first dehydration process according to the invention is particularly preferred because immediately after the completion of dehydration, the slurry is passed with anhydrous acetic acid, catalyst and other additives added thereto, if required, to the acetylation step. Thus, the first dehydration process is simple in operation, and makes it possible to reduce the amount of subordinate material used.

The acetylation and other operations subsequent to the dehydration step of water-wetted pyroxylin may be carried out according to any one of all processes known so far in the art. The inventors have already filed Japanese Patent Application No. 10-195292 to come up with a solid-liquid reaction process wherein pyroxylin is dispersed in a suitable dispersing medium to subject said pyroxylin to an acetylation reaction with anhydrous acetic acid in the presence of a suitable catalyst while the pyroxylin is kept in a fibrous (solid phase) state, thereby obtaining a reaction product, separating the reaction product from a reaction solution by means of filtration, and washing the reaction product with water or the like upon separation. This solid-liquid reaction process, too, can be used in the invention. A solution reaction process can also be used in the invention, in which solution reaction process pyroxylin is dissolved in a suitable organic solvent to subject the pyroxylin to an acetylation reaction with anhydrous acetic acid or the like in the presence of a suitable catalyst, precipitating the reaction product in water or an alcohol, filtering the precipitant, and washing the product with water or the like. The solid-liquid reaction process is particularly preferable to the solution reaction process because the former has the advantage of recovering an extra portion of anhydrous acetic acid that takes no part in the reaction.

The starting pyroxylin material used herein should comprise fine fibers having a fiber diameter of 0.01 mm to 0.05 mm, and preferably 0.15 mm to 0.04 mm, and should be in such a form that they can be dispersed in the dispersion medium and/or the replacing agent. These conditions are needed especially when the invention is applied to the solid-liquid reaction process.

The degree of acetylation of the acetylated pyroxylin according to the present invention may be varied by a choice of the degree of nitration of the starting pyroxylin. In this regard, however, it is noted that the degree of nitration of acetylated pyroxylin may become lower than that of the starting pyroxylin due to denitration of the starting pyroxylin during the production process. Accordingly, the starting pyroxylin should be selected while such a case is taken into account. In the present invention, all pyroxylin materials with known degrees of nitration are available. However, it is preferable to use as the starting material a pyroxylin having a degree of nitration of 0.5 to 2.6, and preferably 1.0 to 2.5. At less than 0.5 any significant feature can hardly be imparted to the resultant acetylated pyroxylin because the performance difference between the acetylated pyroxylin and the starting pyroxylin is small. At greater than 2.6, too, there is little or no characteristic difference between the resultant acetylated pyroxylin and the starting pyroxylin. The degree of nitration of pyroxylin may be determined as by conducting elemental analysis to find the amount of nitrogen.

One embodiment of the invention will now be explained with reference to the solid-liquid reaction process.

The acetylation reaction is carried out by adding an acetylating agent or anhydrous acetic acid and an acetylating catalyst to a pyroxylin-containing slurry after dehydration or wetted pyroxylin after dehydration, if required, with a dispersing medium used for the reaction added thereto. It is noted that the dispersing medium for dehydration and/or the replacing agent for dehydration, which are present together with the pyroxylin after dehydration, may be used as a part or the whole of the dispersing medium for the reaction.

It is required that anhydrous acetic acid be used in an amount of 2 to 20 moles, and preferably 3 to 15 moles per mole of a hydroxyl group in the pyroxylin to be acetylated. At less than 2 moles, the acetylation reaction does hardly proceed. On the other hand, the addition of anhydrous acetic acid in an amount of greater than 20 moles is insignificant. Referring to the second limitation to the amount of anhydrous acetic acid used, it is required that anhydrous acetic acid be used in an amount of up to 20 parts by weight, and preferably up to 15 parts by weight per 100 parts by weight of the dispersion medium. At greater than 20 parts by weight, pyroxylin may possibly be dissolved in the reaction solution, i.e., a medium composed mainly of a solution mixture of the dispersion medium and anhydrous acetic acid, because the anhydrous acetic acid is a good solvent for pyroxylin. This may make it impossible to conduct the reaction of pyroxylin with anhydrous acetic acid while the pyroxylin is kept in a solid phase state. In the solid-liquid reaction process, the first and second limitations to the amount of anhydrous acetic acid should be satisfied at the same time.

For the dispersion medium for the reaction, it is required to use a medium in which both pyroxylin and acetylated pyroxylin are insoluble. For such a medium, it is preferable to use an organic solvent having a boiling point of 40° C. to 200° C., and especially 50° C. to 150° C. at normal pressure. Examples of such an organic solvent are aromatic hydrocarbons having 6 to 10 carbon atoms, as represented by benzene, toluene, and xylene. Preferably, the amount of the dispersion medium should be 10 to 80 times, and especially 15 to 40 times as large as the weight of pyroxylin. In less than ten-fold amounts non-uniform reaction may occur due to insufficient agitation of slurry, and in greater than eighty-fold amounts production efficiency becomes worse although the present invention may be somehow carried out.

For the catalyst, general acetylating catalysts such as sulfuric acid, pyridine and various amines may be used. However, it is preferable to use at least one selected from the group consisting of p-toluenesulfonic acid and perchloric acid. The acetylating catalyst should preferably be used in a net amount of 0.1 to 5.0 parts by weight, especially 0.3 to 2.0 parts by weight for perchloric acid and 5 to 60 parts by weight, especially 10 to 50 parts by weight for p-toluenesulfonic acid, as calculated per 100 parts by weight of the starting pyroxylin. Too little a catalyst makes the acetylation reaction less likely to occur, and too much presents some problems such as possible denitration of pyroxylin and a waste of catalyst.

Basically, the degree of acetylation of the acetylated pyroxylin becomes lower than the amount of the residual hydroxyl group in the starting pyroxylin. In some cases, however, this degree of acetylation becomes higher than the amount of the residual hydroxyl group although depending on the aforesaid degree of denitration. The degree of acetylation may be controlled by the reaction temperature and time as well as the amount of the catalyst and anhydrous acetic acid used. The degree of acetylation should preferably be in the range of 0.3 to 2.0. At less than 0.3, the heat resistance of the acetylated pyroxylin is as low as that of the starting pyroxylin; the effect by acetylation is slender. At greater than 2.0, there is little or no characteristic difference between the acetylated pyroxylin and the starting pyroxylin.

The reaction temperature should preferably be in the range of 25° C. to 50° C., and especially 30° C. to 45° C., and the reaction time should preferably be selected from the range of 0.5 hours to 5 hours, and especially 1 hour to 4 hours. Within these temperature and time ranges, the degree of acetylation may be controlled. When there is a deviation from these temperature and time ranges, i.e., when the reaction temperature is too low or the reaction time is too short, however, any acetylation reaction does not substantially occur. When the reaction temperature is too high or the reaction time is too long, on the other hand, denitration is likely to occur or other problem may arise.

After the acetylation reaction of the starting pyroxylin, it is required that crude acetylated pyroxylin be separated from the reaction solution by means of filtration. It is then possible to recover anhydrous acetic acid, the organic solvent used as the dispersing medium, and reaction by-products such as acetic acid from the filtrate by means of generally used distillation processes, etc. In the present disclosure, the term "crude acetylated pyroxylin" is used to stress that the acetylated pyroxylin is in a green or unpurified state.

The crude acetylated pyroxylin obtained after filtration is of low stability, partly because the reaction solution does not only deposit on the surface of the pyroxylin but also penetrates into the pyroxylin, and partly because the catalyst bonds to the interior of the pyroxylin. It is thus required that the crude acetylated pyroxylin be repeatedly washed and filtered with water and/or the washing agent. For washing, water is primarily used because of its inexpensiveness. However, it is acceptable to use other washing solvent optionally with water.

For the washing agent in this case, use may be made of an organic solvent in which acetylated pyroxylin is insoluble. For instance, it is preferable to use an aromatic hydrocarbon such as toluene, and an alcohol having 1 to 10 carbon atoms, e.g., methanol, ethanol, n-propanol, isopropanol, n-butanol and isobutanol. Although washing may be carried out at room temperature, it is acceptable to add a washing step at a temperature of 60° C. to 105° C. to the room-temperature washing step.

As a stabilizer for improving the stability of acetylated pyroxylin, a compound or compounds of an alkaline metal and/or an alkaline earth metal represented as by sodium carbonate, sodium acetate, calcium hydroxide and calcium acetate should preferably be dissolved in and added to the water acting as the washing agent at a concentration of about 10 to 5,000 ppm, and especially about 50 to 1,000 ppm.

Another embodiment of the invention will now be explained with reference to the solution reaction process.

The solvent necessary to dissolve pyroxylin therein is first charged in a dehydrated pyroxylin-containing slurry or wetted pyroxylin upon dehydration. Then, an acetylation reaction is carried out by adding thereto anhydrous acetic acid as an acetylating agent and the aforesaid acetylating catalyst, as in the solid-liquid reaction process.

For the aforesaid solvent, it is required to use a solvent in which pyroxylin is soluble, for instance, ketones such as acetone and esters such as ethyl acetate. The anhydrous acetic acid for the acetylating agent, when used in large amounts, may be used as the solvent for pyroxylin.

After the acetylation reaction, the reaction solution is mixed with a precipitating medium such as water or ethanol for precipitation of crude acetylated pyroxylin. The precipitated crude acetylated pyroxylin is filtered, and washed as in the solid-liquid reaction process, thereby producing acetylated pyroxylin.

According to the invention, it is thus possible to dehydrate water-wetted pyroxylin for the production of acetylated pyroxylin from the thus dehydrated pyroxylin using the solid-liquid reaction process or the solution reaction process. The thus produced acetylated pyroxylin can be used as raw materials for explosives, paints, etc.

In the invention, the heat resistance was estimated by differential thermal analysis, and the stability was estimated in terms of heat life according to JIS-K4810, although details thereof will be described in the following examples.

EXAMPLE

By way of detailed illustration but not by way of limitation, the present invention are now explained with reference to some examples.

Example 1

One hundred and thirty-six (136) grams of pyroxylin made by Daicel Chemical Industries Ltd. with a wetting water content of 36 grams and a nitric acid ester substitution degree of 2.5 were charged with 1,400 grams of toluene in a flask, which was heated at normal pressure. Upon the internal temperature reaching 87° C., boiling started with the initiation of running of condensed liquid of boiling vapor from a condenser connected to the flask. Fifteen (15) minutes after the start of boiling, the internal temperature of the flask reached 97° C., and the amounts of the lower (water) and upper (toluene) layers of the liquid distillate reached 20 ml and 40 ml, respectively. Forty-five (45) minutes after the start of boiling, the internal temperature of the flask reached 105° C., and the amounts of the lower and upper layers of the liquid distillate reached 27 ml and 73 ml, respectively. After the lapse of 60 minutes, the internal temperature of the flask reached 108° C., and the amounts of the lower and upper layers of the liquid distillate reached 27 ml and 91 ml, respectively. At the time no further increase in the amount of the lower layer of the liquid distillate was found, the dehydration operation was brought to an end and the flask was cooled down to 30° C.

A further 1,300 grams of toluene and 109 grams of anhydrous acetic acid were added to the flask, and while the flask was kept at 30° C., a liquid mixture of 0.3 grams of a catalyst perchloric acid and 40 grams of acetic acid was added thereto for a three-hour reaction. After the reaction, 0.5 grams of sodium acetate were added to the reaction product, followed by cooling. During this process, the pyroxylin and the reaction product, i.e., crude acetylated pyroxylin were dispersed in the reaction solution while they were kept in a solid phase (fine fiber) state. This solid-liquid mixture was separated by filtration into a filtrate and crude acetylated pyroxylin that was a fiber form of powder solid.

The crude acetylated pyroxylin was stirred at normal pressure and a reflux temperature for 1 hour with the addition thereto of 2,400 grams of isopropanol and 4 0.5 grams of sodium carbonate. The solution was cooled back to room temperature for removal of solid matter by filtration. The solid matter was washed with 10,000 grams of water, then dispersed in 4,000 grams of water, and then stirred for 20 minutes with the addition thereto of 0.3 grams of calcium acetate. After filtration, the solid matter was washed and filtered twice with 2,400 grams of ethanol to obtain purified acetylated pyroxylin.

Observation of the acetylated pyroxylin and the starting pyroxylin under an optical microscope indicated that the starting pyroxylin comprises fibers of 0.02 mm to 0.03 mm in diameter and 0.5 mm to 2.0 mm in length as a primary component, and the acetylated pyroxylin, too, has quite the same fiber form, showing that the fiber form remains intact even through the aforesaid dehydration and production steps.

Studies of infrared absorption spectra for the acetylated pyroxylin showed that there is strong absorption around both 1280 cm$^{-1}$ and 1650 cm$^{-1}$ based on nitric acid ester, and absorption spectra for acetic acid ester resulting from acetylation are found around both 1220 cm$^{-1}$ and 1750 cm$^{-1}$, each with medium strength. On the other hand, weak and broad absorption based on hydroxyl groups, which was found around 3500 cm$^{-1}$ in the starting pyroxylin, became very 35 feeble. In the obtained acetylated pyroxylin, it was thus found that nearly all hydroxyl groups in the starting pyroxylin are acetylated.

Differential thermal analysis (DTA) was conducted to determine the heat resistance of the acetylated pyroxylin. Weighed 1 mg of an acetylated pyroxylin sample was placed on an aluminum dish for differential thermal analysis, and some droplets of acetone were added to the sample for dissolution. The solution was then dried to form an acetylated pyroxylin film on the bottom of the aluminum dish. For this sample, differential thermal analysis was conducted at a heating rate of 10° C./min. in an argon stream, using a differential thermal analyzer DT40 made by Shimadzu Corporation. As a result, an thermal decomposition exothermic curve having a peak at 210° C. was obtained.

To determine the stability of this acetylated pyroxylin, heat-life was measured according to the 650° C. heat resistance 15 test method (JIS-K4810), using potassium iodide starch paper as test paper. As a result, the heat-life was found to be 40 minutes or longer. However, the test was aborted after the lapse of 40 minutes because the test paper did not change color.

The results of the above tests are set out in Table 1.

Comparative Example 1

Similar differential thermal analysis and heat resistance testing were carried out for the starting pyroxylin used in Example 1. As shown in Table 1, the exothermic peak temperature was 199° C., and the heat life was 38 minutes as determined according to the 650° C. heat resistance test method. These results are shown in Table 1 together with the results of infrared absorption spectra.

Example 2

One half of 1,600 grams of a liquid mixture of toluene/acetic acid at a weight ratio of 60/40 prepared as the replacing agent was added to 136 grams of the water-wetted pyroxylin containing 36 grams of wetting water, and they were then filtered upon mixture. Another half of the liquid mixture was added to the solid matter obtained upon filtration, and they were similarly mixed and filtered. The wet weight of the pyroxylin obtained upon filtration was 191 grams.

Charged in a flask were 2,600 grams of the post-filtration wetted pyroxylin and 109 grams of anhydrous acetic acid, which were then stirred. When the flask was kept at 30° C., a liquid mixture of 0.3 grams of perchloric acid and 40 grams of acetic acid was added thereto for a three-hour reaction. After the reaction, the same operation as in Example 1 was repeated to obtain purified acetylated pyroxylin.

This acetylated pyroxylin was estimated as in Example 1. The results are shown in Table 1.

TABLE 1

|  | Example 1 | Example 2 | Comp. Ex. 1 (pyroxylin) |
|---|---|---|---|
| Infrared absorption spectra (*) | | | |
| For nitric acid ester | strong | strong | strong |
| For acetic acid ester | medium | medium | not found |
| For hydroxyl group | feeble | feeble | weak (broad) |
| Heat resistance (DTA) | | | |
| Exothermic peak Temp. (° C.) | 210 | 209 | 199 |
| Stability (65° C. heat resistance test) | | | |
| Heat-life (**) (min.) | >40 | >40 | 38 |

TABLE 1-continued

|  | Example 1 | Example 2 | Comp. Ex. 1 (pyroxylin) |
|---|---|---|---|

(*) Absorption for nitric acid ester:
Identification of absorption peak strength around 1280 cm$^{-1}$ and 1650 cm$^{-1}$
Absorption for acetic acid ester:
Identification of absorption peak strength around 1220 cm$^{-1}$ and 1750 cm$^{-1}$
Absorption for hydroxyl group:
Identification of absorption peak strength around 3500 cm$^{-1}$
(**) The test was aborted when the test paper did not change color even after the lapse of 40 minutes. This is shown by >40.

APPLICABILITY TO THE INDUSTRY

According to the present invention, inexpensive water-wetted pyroxylin rather than expensive alcohol-wetted pyroxylin is dehydrated with safety to avert any reaction between water in the water-wetted pyroxylin and anhydrous acetic acid, so that the pyroxylin acetylation reaction can be carried out while avoiding a waste of anhydrous acetic acid, thereby producing acetylated pyroxylin excellent in heat resistance and stability at low cost.

What we claim is:

1. A method for producing acetylated pyroxylin by permitting an acetylating agent and a catalyst to act on pyroxylin, wherein water-wetted pyroxylin is dehydrated in the presence of a nonalcoholic non-solvent for pyroxylin, by (i) adding said water-wetted pyroxylin in a dispersing medium provided by said nonalcoholic non-solvent for pyroxylin to form a dispersion, and then distilling said dispersion, or (ii) adding said nonalcoholic non-solvent for pyroxylin to said water-wetted pyroxylin as a replacing agent, and filtering said water-wetted pyroxylin, and the acetylating agent is then permitted to act on dehydrated pyroxylin in the presence of the catalyst and in the presence of (i) the dispersing medium or (ii) the replacing agent.

2. The method according to claim 1, wherein said acetylating agent is anhydrous acetic acid.

3. The method according to claim 1, wherein said dispersing medium is an aromatic hydrocarbon having 6 to 8 carbon atoms.

4. The method according to claim 1, wherein said replacing agent is an aromatic hydrocarbon having 6 to 8 carbon atoms.

5. The method according to claim 1, wherein said replacing agent is a mixture of an aromatic hydrocarbon having 6 to 8 carbon atoms and a nonalcoholic hydrophilic solvent, said mixture having a composition incapable of dissolving pyroxylin therein.

6. The method according to claim 5, wherein said mixture is a mixture of said aromatic hydrocarbon having 6 to 8 carbon atoms and acetic acid at a weight ratio of 40/60 to 95/5.

7. The method according to claim 1, wherein said aromatic hydrocarbon having 6 to 8 carbon atoms, with a surface activenagent added thereto.

8. The method according to claim 3, wherein said aromatic hydrocarbon is toluene.

* * * * *